United States Patent [19]
Okamoto et al.

[11] Patent Number: 6,134,384
[45] Date of Patent: Oct. 17, 2000

[54] DIGITAL SIGNAL RECORDING/ REPRODUCING APPARATUS AND RECORDING METHOD

[75] Inventors: Hiroo Okamoto; Takaharu Noguchi; Hitoaki Owashi, all of Yokohama, Japan

[73] Assignee: Hitachi, Ltd., Tokyo, Japan

[21] Appl. No.: 08/810,070

[22] Filed: Mar. 4, 1997

[30] Foreign Application Priority Data

| Mar. 4, 1996 | [JP] | Japan | 8-045804 |
| Mar. 5, 1996 | [JP] | Japan | 8-047078 |

[51] Int. Cl.$^7$ .................................................. H04N 5/911
[52] U.S. Cl. .............................. 386/116; 360/124; 360/32
[58] Field of Search ................................... 386/109, 112, 386/113, 114, 116, 83, 124; 360/32, 69

[56] References Cited

U.S. PATENT DOCUMENTS

| 5,479,302 | 12/1995 | Haines | 360/69 |
| 5,706,385 | 1/1998 | Suzuki et al. | 386/34 |

FOREIGN PATENT DOCUMENTS

| 0548887 | 6/1993 | European Pat. Off. . |
| 0606180 | 7/1994 | European Pat. Off. . |
| 5-174496 | 7/1993 | Japan . |
| 2231193 | 11/1990 | United Kingdom . |

OTHER PUBLICATIONS

*Patent Abstracts of Japan*, vol. 15, No. 466 (P–1280), Nov. 26, 1991, for Japanese Kokai 3–198212 published on Aug. 29, 1991.

M. Fujita et al., "Newly Developed D–VHS Digital Tape Recording System for the Multimedia Era", 1996 Digest of Technical Papers, International Conference on Consumer Electronics, Jun. 5–7, 1996, IEEE Consumer Electronics Society, pp. 282–283.

*Patent Abstracts of Japan*, vol. 11, No. 305 (P–623), Oct. 6, 1987, for Japanese Kokai 62–95789 on published May 2, 1987.

*Patent Abstracts of Japan*, vol. 13, No. 112 (P–844), Mar. 17, 1989, for Japanese Kokai 63–288492 published on Nov. 25, 1988.

*Primary Examiner*—Wendy Garber
*Assistant Examiner*—Christopher Onuaku
*Attorney, Agent, or Firm*—Antonelli, Terry, Stout & Kraus, LLP

[57] ABSTRACT

An apparatus and method for recording on and reproducing from a magnetic tape a digital signal by rotating heads. A synchronizing signal, a control signal, and an error correction code are added to the digital signal, and the digital signal with those signals added is converted into a block form. At the recording time, a recording signal produced from a recording circuit is recorded on the recording medium by a first head of the rotating heads, and at the same time the recorded signal is reproduced by a second head of the rotating heads. In addition, there are provided a first recording mode in which two error correction codes are added, and a second recording mode in which three error correction codes are added. Thus, the recorded signal can be confirmed by the simultaneous playback made at the recording time so that the reliability in data can be assured.

16 Claims, 12 Drawing Sheets

DIGITAL SIGNAL RECORDING/ REPRODUCING APPARATUS AND RECORDING METHOD

BACKGROUND OF THE INVENTION

The present invention relates to a digital signal recording/ reproducing apparatus and recording method for recording and/or reproducing a digital signal, and particularly to a digital signal recording/reproducing apparatus and recording method for recording and/or reproducing a digital signal on a magnetic tape by use of rotating heads.

A digital signal recording apparatus is disclosed in JP-A-5-174496. This apparatus records a digital compressed video signal on a magnetic tape by use of rotating heads. However, there is no consideration about the improvement in the reliability at the time of recording.

SUMMARY OF THE INVENTION

It is an object of the invention to provide a digital signal recording and reproducing apparatus capable of recording and reproducing even digital data that needs high reliability, without increasing the circuit scale.

It is another object of the invention to reduce the number of heads and make it unnecessary to use a signal timing converter by use of only one azimuth head when digital data that needs high reliability is recorded and reproduced.

It is still another object of the invention to increase the storage capacity and raise the reliability by use of two or three error correction codes according to the intention.

According to the present invention, there is provided a digital signal recording and reproducing apparatus for recording on and reproducing from each of tracks, or digital signal recording areas of a magnetic recording medium a plurality of blocks each consisting of a digital signal, and added signals of a synchronizing signal, a control signal and an error correction code, this apparatus including a memory for storing the digital signal fed at the time of recording or produced at the time of reproduction, error correction code adding circuits for adding error correction codes to the digital signal stored in the memory, a recording circuit for making a block-type signal of the blocks from the digital signal with the error correction codes added by the error correction code adding circuit, a reproducing circuit for detecting the digital signal and the error correction codes from a reproduced signal, error correction circuits for detecting and correcting error of the digital signal on the basis of the error correction codes detected by the reproducing circuit, and a plurality of rotating heads for recording and reproduction, whereby at the recording time a recording signal produced from the recording circuit is recorded on the recording medium by a first head of the rotating heads, the recorded signal is reproduced by a second head of the rotating heads at the same time as the recording time so that the reproducing circuit and the error correction circuits can detect error from the reproduced signal, and at the playback time the recorded signal is reproduced by the first head, the resulting reproduced signal being fed to the memory after error detection by the reproducing circuit and the error correction circuits.

In addition, according to the present invention, there is provided a digital signal recording method and apparatus for recording on each of tracks, or digital signal recording areas of a magnetic recording medium a plurality of blocks each consisting of a digital signal, and added signals of a synchronizing signal, a control signal and an error correction code, this method and apparatus having a first recording mode for adding a first error correction code to each n tracks (n is an integer larger than 1) of the digital signal, adding a second error correction code to each block of the digital signal and the first error correction code, and recording the digital signal with the first and second error correction codes added, and a second recording mode for adding a third error correction code to each n tracks of the digital signal, adding a fourth error correction code to each track of the digital signal and the third error correction code, adding a second error correction code to each block of the digital signal, the third error correction code and the fourth error correction code, and recording the digital signal with the second, third and fourth error correction codes added.

BRIEF DESCRIPTION OF THE DRAWINGS

Preferred embodiments of the present invention will now be described in conjunction with the accompanying drawings, in which.

DESCRIPTION OF THE PREFERRED EMBODIMENTS

An embodiment of the invention will be described with reference to the accompanying drawings.

Figure 1:
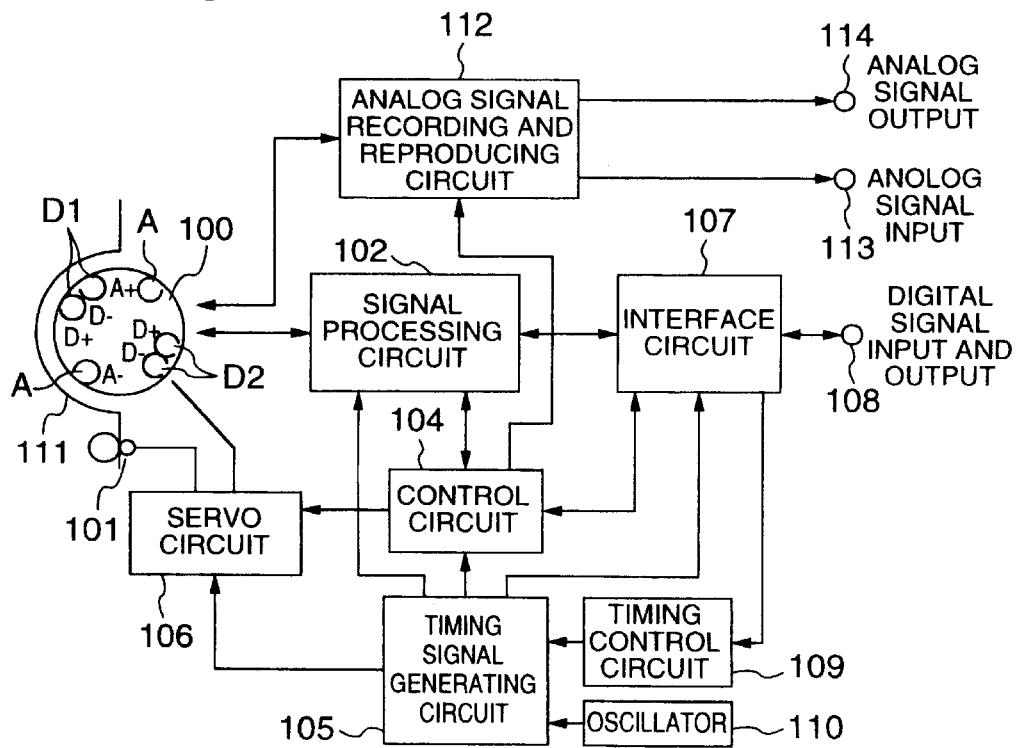
FIG. 1 is a block diagram of the first embodiment of a digital signal recording and reproducing apparatus according to the invention.

FIG. 1 is a block diagram of a digital signal recording and reproducing apparatus according to the invention. The digital signal recording and reproducing apparatus in FIG. 1 is constructed for both recording and reproduction, but may be, of course, arranged for either recording or reproduction. There are shown rotating heads 100, a capstan 101, a signal processing circuit 102 for generating a recording signal at the time of recording and demodulating a reproduced signal at the time of reproduction, a control circuit 104, such as a microprocessor, for controlling the recording and reproduction modes, a timing signal generating circuit 105 for generating timing signals that are used as reference signals for controlling the rotation of heads 100 and for other purposes, and a servo circuit 106 for controlling the rotating heads and the tape transport speed. There are also shown an interface circuit 107 to which a recording signal is fed or from which a reproduced signal is produced, a timing control circuit 109 for controlling the timing at the time of recording, an oscillator 110 for generating a reference clock, a tape 111, and an analog signal recording and reproducing circuit for an analog video signal. The rotating heads 100 include first and second heads D1, D2 (D+, D−) for recording and reproducing a digital signal, and heads A (A+, A−) for recording and reproducing an analog signal.

At the time of recording, recording data of a packet form are supplied via an input/output terminal 108 at arbitrary intervals of time. A part of the packet data from the input/output terminal 108 is supplied through the interface circuit 107 to the control circuit 104. The control circuit 104 detects the kind of packet data and the maximum transmission rate on the basis of information added to the packet data or information transmitted independently of the packet data, decides a recording mode according to the detected result, and controls the signal processing circuit 102 and the servo circuit 106 to operate in a certain mode. The interface circuit 107 detects the packet data being recorded, and supplies it to the signal processing circuit 102. The signal processing circuit 102 is responsive to the recording mode decided at the control circuit 104 to decide the number of packets being recorded on one track, generates error correction codes, ID information and subcodes, and supplies a recording signal to the rotating heads 100 by which the signal is recorded on the magnetic tape 111.

At the time of reproduction, the recorded signal is reproduced in an arbitrary reproduction mode, and the signal processing circuit 102 detects ID information from the reproduced signal. The control circuit 104 decides which mode the signal was recorded in, and controls the signal processing circuit 102 and servo circuit 106 to be set to a new operation mode, causing the heads to reproduce the recorded signal. The signal processing circuit 102 detects the synchronizing signal, makes error detection and correction, and reproduces data and subcodes on the basis of the reproduced signal from the heads 100, and it supplies them to the interface circuit 107. The interface circuit 107 produces the reproduced data at its input/output terminal 108 according to the timing signal generated from the timing signal generating circuit 105.

When an analog video signal is recorded and reproduced, an analog video signal fed via an input terminal 113 at the time of recording is processed in a certain way by the analog signal recording and reproducing circuit 112 and supplied to the rotating heads 100 by which it is recorded on the tape 111. The reproduced video signal from the rotating heads 100 at the time of reproduction is processed in a certain way by the analog signal recording and reproducing circuit 112, and then produced at its output terminal 114. In this case, the servo circuit 106 is controlled in synchronism with the frame period of the analog video signal, though not shown. Although the heads for analog video signal are provided independently of the digital recording heads as seen from FIG. 1, the digital recording heads may be used both as the analog recording heads and as themselves instead of the analog recording heads or the analog recording heads may be provided independently of the digital recording heads.

The digital signal recording and reproducing apparatus of this embodiment is able to record and reproduce both a digital compressed video signal, and digital data such as a computer program.

First, the recording and reproduction of a digital compressed video signal will be described below.

Figure 2:
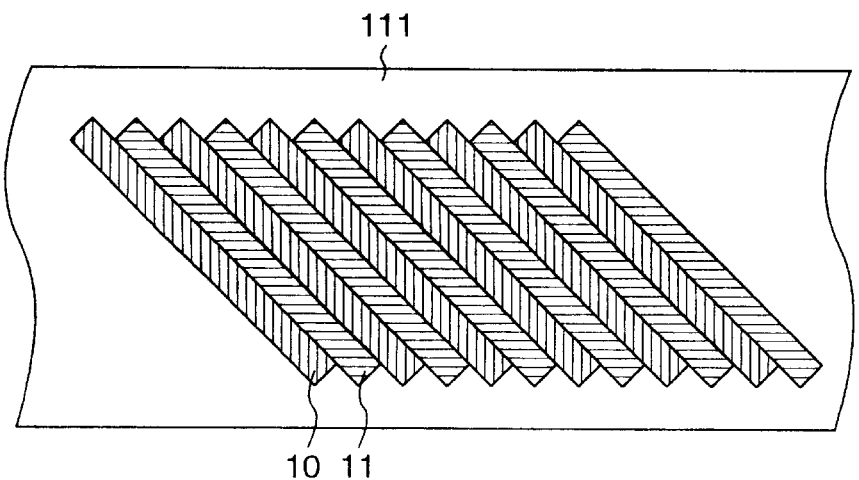
FIG. 2 is a diagram of a pattern recorded on a magnetic tape.

FIG. 2 shows a recorded pattern on the tape 111. There are shown +azimuth tracks 10 and −azimuth tracks 11, which are recorded and reproduced by +azimuth heads (D+) and −azimuth heads (D−), respectively.

Figure 3:
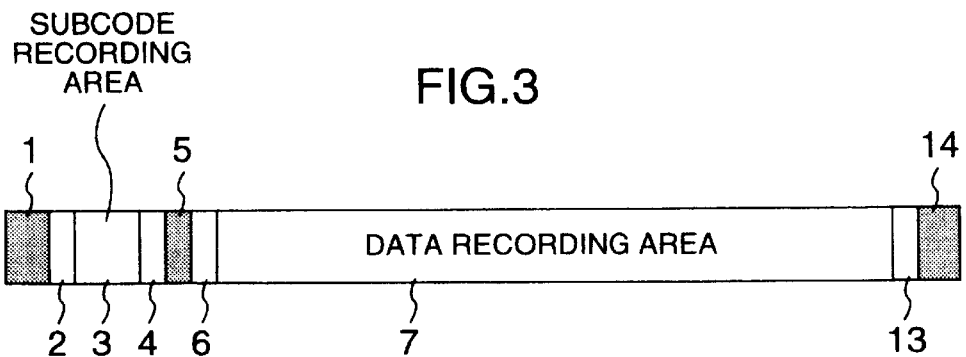
FIG. 3 is a diagram of a recorded pattern of each track.

FIG. 3 shows a recorded pattern of one track. There are shown a subcode recording area 3 in which a subcode such as time stamp and program information is recorded, a data recording area 7 in which a digital compressed video signal is recorded, preambles 2, 6 for those recording areas, postambles 4, 13 for those recording areas, a gap 5 between those recording areas, and margins 1, 14 at the ends of the track. Thus, by providing the postambles, preambles and gap to those recording areas, it is possible to perform after-recording for each region. Of course, a digital signal other than the digital compressed video signal and audio signal may be recorded in the data recording area 7. In addition, a digital compressed audio signal may be recorded in the data recording area 7 together with the digital compressed video signal.

Figure 4A:
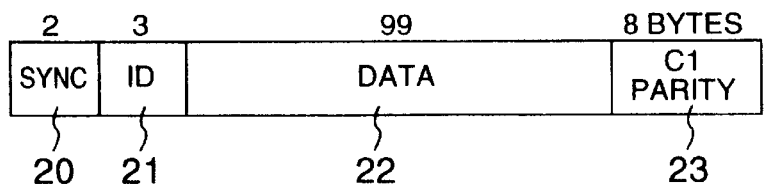
FIGS. 4A and 4B are diagrams of blocks in respective regions.
Figure 4B:
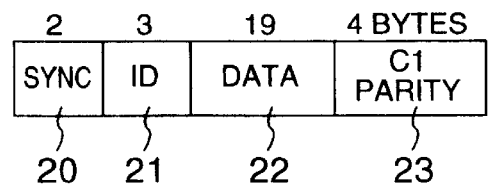

FIGS. 4A and 4B show the block formats of those regions. FIG. 4A illustrates the block format in the data recording area 7. There are shown a synchronizing signal 20, ID information 21, data 22, and a parity (C1 parity) 23 for first error detection and correction. For example, the synchronizing signal 20 is formed of 2 bytes, the ID information 21 of 3 bytes, the data 22 of 99 bytes and the parity 23 of 8 bytes, one block thus consisting of 112 bytes. FIG. 4B shows the block format in the subcode recording area 3. The block in the subcode recording area has the synchronizing signal 20 and ID information 21 of the same bytes as in FIG. 4A, the data 22 of 19 bytes and the parity 23 of 4 bytes, one block thus consisting of 28 bytes, or ¼ the total bytes of the block in FIG. 4A. Since the byte number ratio between those one-block regions is an integer and the same synchronizing signal 20 and ID information 21 are provided in all regions as described above, a single circuit can be used to perform the process for the generation of blocks and the detection of synchronizing signal and ID information at the time of recording. The synchronizing signal 20 may take a different value in each region so that the areas can be distinguished by only the synchronizing signal.

Figure 5:
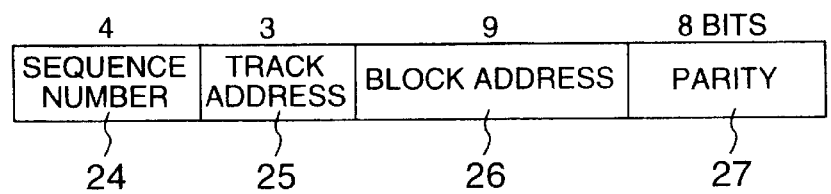
FIG. 5 is a diagram of the format of the ID information 21 shown in FIGS. 4A and 4B.

FIG. 5 illustrates the format of ID information 21. There are shown a sequence number 24, a track address 25, a block address 26 within one track, and a parity 27 for detecting error in the sequence number 24, track address 25 and block address 26. The block address 26 is used to identify the block in each recording area. For example, the address is 0~335 in the data recording area 7, 0~13 in the auxiliary information recording area 3, and 0~15 in the subcode recording area 12. The track address 25 is used to identify the track. For example, the address can be changed to be 0~5 or 0~2 at each track or each two tracks, thereby discriminating 6 tracks. The sequence number 24 can be changed to be 0~11 at each 6 tracks that are discriminated by the track address 25, thereby discriminating 72 tracks. If the track address and the sequence number are respectively synchronized with the period of the second error correction code and the variable speed playback data recording period which will be described later, it is possible to make it easy to process at the recording time and discriminate at the reproducing time.

Figure 6:
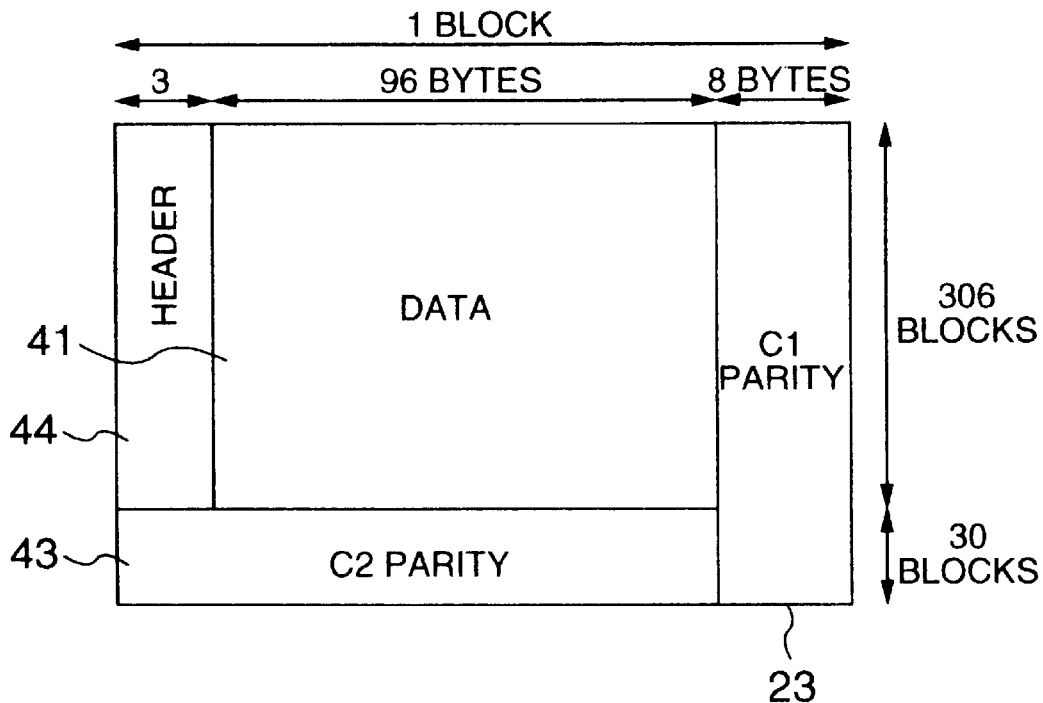
FIG. 6 is a diagram of the structure of one-track data in the data recording area 7 shown in FIG. 3.

FIG. 6 illustrates the format of one-track data in the data recording area 7. The synchronizing signal 20 and ID information 21 are omitted. The data recording area 7 is formed of, for example, 336 blocks, of which the first 306 blocks record data 41, and of which the second 30 blocks record second error correction codes (C2 parity) 43.

The C2 parity 43 are provided such that 10 blocks of C2 parity are added to 102 blocks of data which correspond to a fraction 1/18 of data of 306 blocks×6 tracks at each 6 tracks. The error correction code may be, for example, a Reed-Solomon code.

Figure 7:
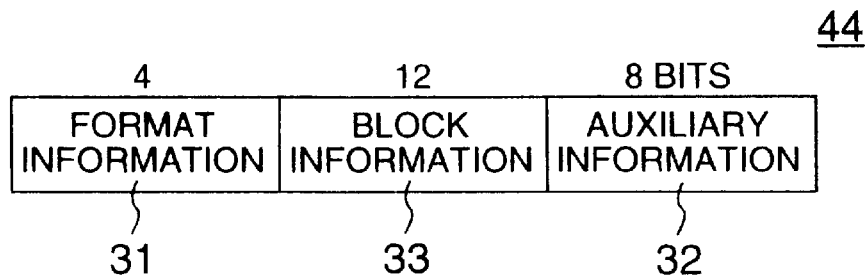
FIG. 7 is a diagram of the header 44 of the data recording area 7 shown in FIG. 3.

Data of 99 bytes of each block is formed of a header 44 of 3 bytes and data 41 of 96 bytes. FIG. 7 shows the format of the header 44 of the data recording area 7. The header 44 is formed of format information 31, auxiliary information 32 and block information 33.

Figure 8:
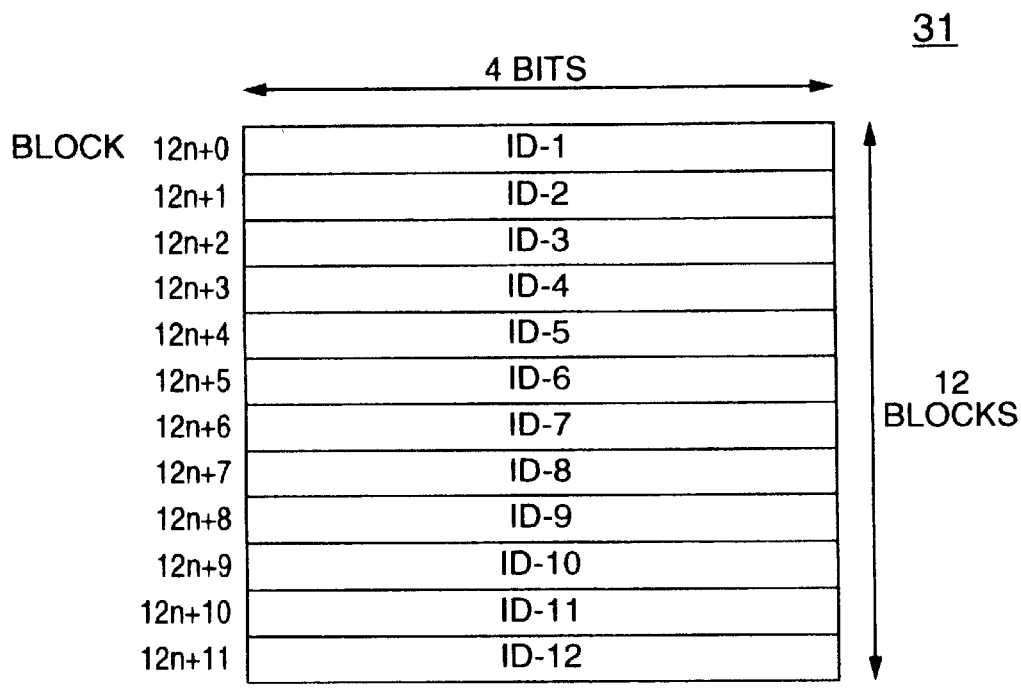
FIG. 8 is a diagram of the format of the format information 31 shown in FIG. 7.

FIG. 8 shows the format of the format information 31. The format information 31 is the information about recording format, and is formed of, for example, 6 bytes of 12 blocks. This information is recorded a plurality of times in a multiplex manner to improve the detection ability at the reproduction time. Data of 6 blocks includes, for example, one-block size, the number of programs being recorded, revolution rate of rotating heads, error correction code system, recording mode, format of data being recorded, and so on.

The recording mode (ID1) specifies, for example, the maximum recording capacity. In this embodiment, data of about 25 Mbps can be recorded by use of four rotating heads at a revolution rate of 1800 rpm on two channels. Here, if recording is performed on every other track, the recording capacity is about 12.5 Mbps. If recording is performed on every fourth track, the recording capacity is about 6.25 Mbps. In this case, if the tape transport speed is reduced to ½ or ¼ the original rate, the track pattern on the tape is substantially the same as the original one. Similarly, the maximum recording capacity can be decreased to 1/n the capacity of 25 Mbps. At the time of recording, the transmission rate of data being recorded is detected, and an optimum recording mode is fixed according thereto. Then, the recording mode is written in the format information 31. For example, "1" is written for 25 Mbps, "2" for 12.5 Mbps, and "3" for 6.25 Mbps.

The format (ID2) of data being recorded specifies, for example, the length of each packet to be recorded. The amount of data to be recorded on each track is controlled in packet units, and the number of packets recorded is stored, in order that data can be transferred at an arbitrary transmission rate. The control can be made once for each track or each plurality of tracks. In addition, by storing the packet length, it is possible to treat a packet of an arbitrary length.

At the reproduction time, the format information 31 is detected so that the associated recording mode or the like is discriminated from the others, and the reproducing processor circuit is set to that mode.

Figure 9:
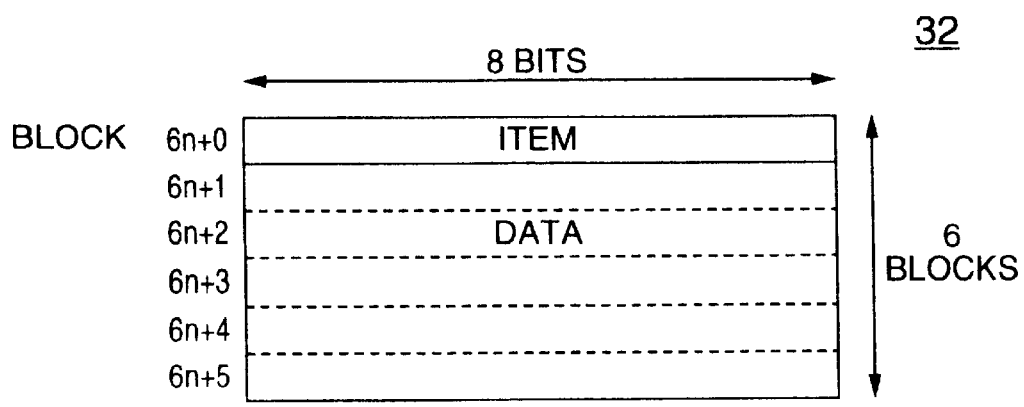
FIG. 9 is a diagram of the format of the auxiliary information 32 shown in FIG. 7.

FIG. 9 shows the format of the auxiliary information 32. The auxiliary information 32 is formed of, for example, 6 blocks of 6 bytes, including an item code of the first bit indicative of the kind of information, and data of the remaining five bytes. Thus, various types of data can be recorded. For example, information of recording time or the like and kinds of recording signals are written as the auxiliary information. Also, detailed information about variable speed playback data may be included in this information in association with the format information 31.

Figure 10:
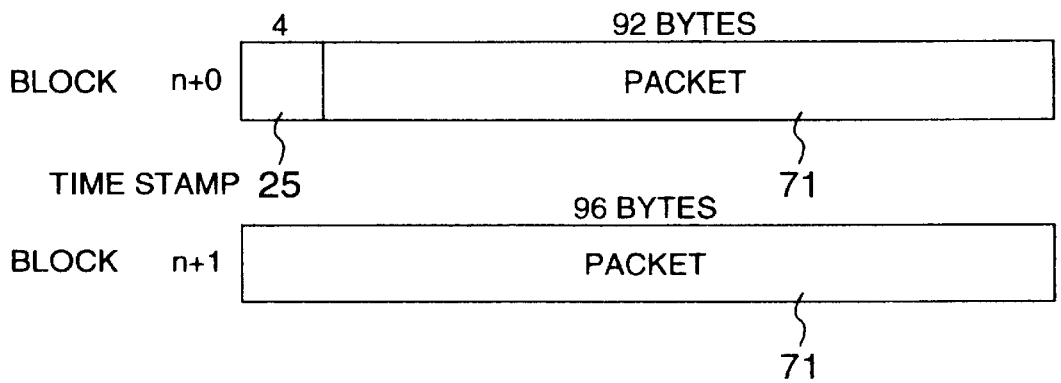
FIG. 10 is a diagram of the format of blocks of a digital compressed video signal transmitted in the form of a packet of 188 bytes, these blocks being recorded in the data recording area 41 shown in FIG. 6.

FIG. 10 illustrates the format of blocks of a digital compressed video signal that is transmitted in a packet form of 188 bytes and stored in the data recording area 41. In this case, since a time stamp 25 of 4 bytes is added to the packet data, a total of 192 bytes per packet is recorded over two blocks. Since each packet of data is recorded as two blocks, namely in association with one code system of C1, error can be prevented from occurring over a plurality of packets as transmission units when each block cannot be corrected because of burst error due to dropout or the like on the tape.

Figure 11:
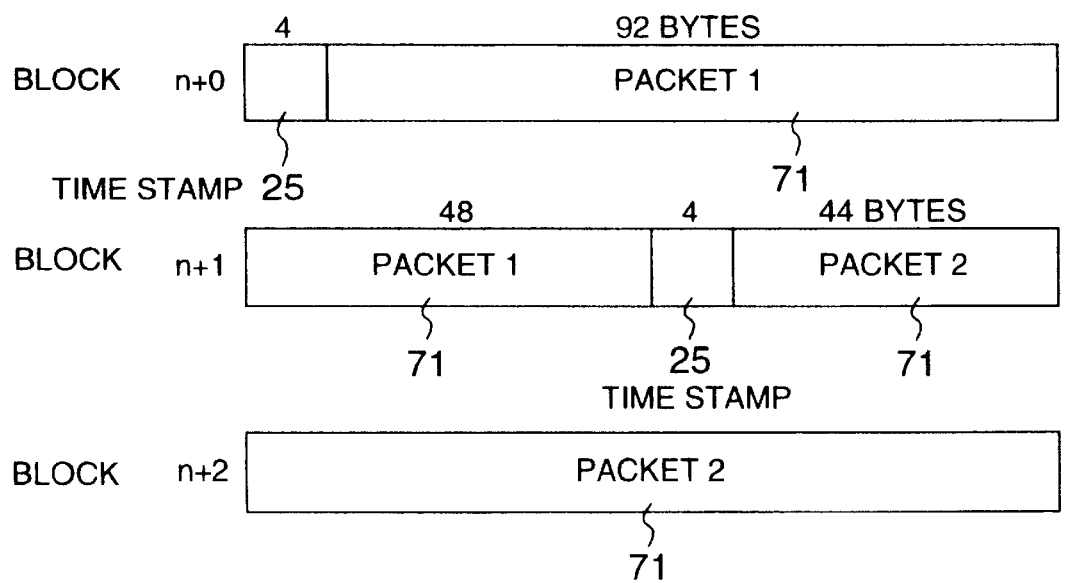
FIG. 11 is a diagram of one format of blocks of which the packet 71 has a length of 140 bytes.
Figure 12:
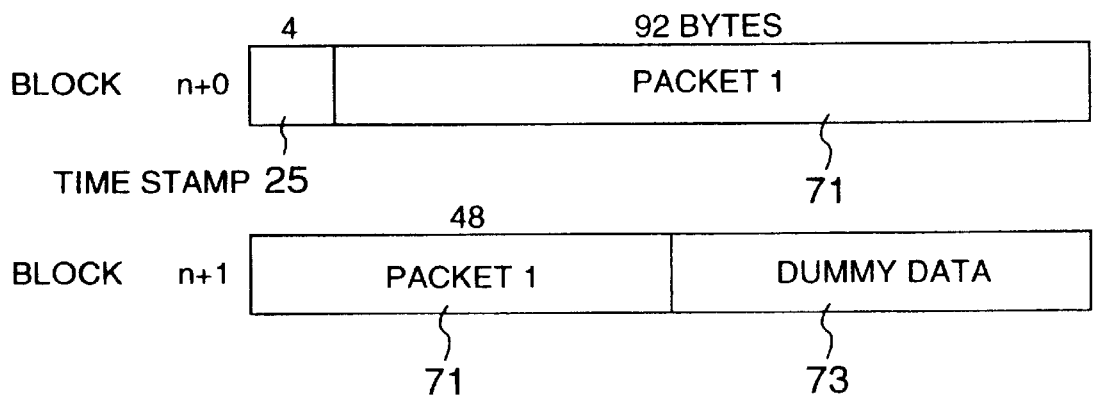
FIG. 12 is a diagram of another format of blocks of which the packet 71 has a length of 140 bytes.

FIG. 11 shows the format of blocks of packets 71 of which the length is 140 bytes. In this case, two packets 71 are recorded over three blocks. If there is only one packet, the packet is recorded over two blocks as shown in FIG. 12. In other words, one packet is recorded over 1.5 blocks and dummy data is placed on the remaining 0.5 block.

Figure 13:
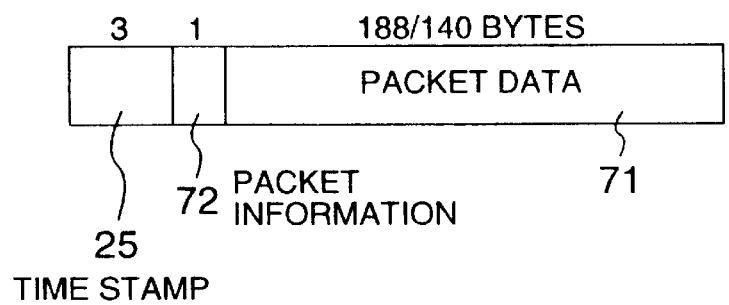
FIG. 13 is a diagram of another format of the packet shown in FIG. 10, 11 or 12.

FIG. 13 shows another format of the packet given in FIG. 10, 11 or 12. The packet consists of, for example, time stamp 25 of 3 bytes, packet information 72 of 1 byte associated with the packet, and packet data 71 of 188 bytes or 140 bytes. If the amount of packet data 71 is less than that value, for example, 130 bytes, dummy data is added or the packet control information region may be expanded.

The time stamp 25 is information of the time in which the packet is transmitted. That is, the time at which the packet (its head) is transmitted or the interval between packets is counted on a reference clock, the count is recorded together with packet data, and the interval between packets is fixed on the basis of that information at the playback time, so that data can be produced in the same form as when transmitted.

Thus, if the ratio between the byte number of one packet and the byte number of the recording area of one block is expressed in an integral ratio n:m so that m packets can be recorded over n blocks, data can be efficiently recorded even when the packet length is different from that of the recording area of one block. In addition, even when the number of packets is not just an integer m, for example, m'(m'<m), the m' packets can be effectively recorded by arranging over m'×n/m blocks.

The values of n and m are respectively smaller than the number of bytes of one packet and the number of bytes of the recording area of one block. Thus, the process can be easily performed by selecting integers of 10 or below for those values. Even when the length of one packet is longer than that of the recording area of one block (n>m), data can be recorded similarly. Moreover, even if the packets have different lengths, the recording and reproduction process can be performed with ease by employing the same format for the time stamp or the like. The different lengths of packets can be discriminated by use of the format information 31.

Figure 14:
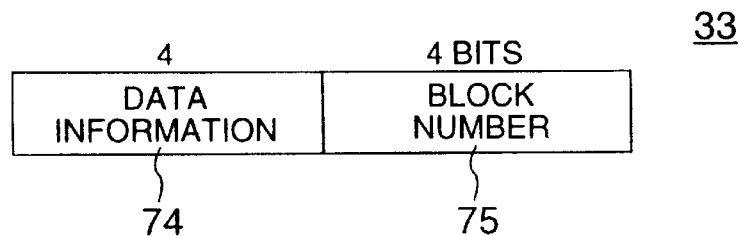
FIG. 14 is a diagram of the format of the block information 33 shown in FIG. 7.

FIG. 14 illustrates the format of block information 33. The block information 33 is the information for discrimination of data of block units. The data information 74 is for discrimination of the kind of data recorded in the block. For example, it is turned 0 for the block in which normal packet data is recorded, 1 for the block in which no effective data is recorded, and 2 for the block in which variable speed playback data is recorded.

The block number 75 is the information for discrimination of the order of blocks when the packet data is recorded over two blocks or three blocks. For example, the block number is 0~1 when the packet data is recorded over two blocks, and 0~2 when it is recorded over three blocks. Moreover, if the end of the recording area can be known by this information, the process at the playback time can be performed with ease.

The recording and reproduction of digital data will be described below.

Even when digital data is recorded and reproduced, the recording and reproducing apparatus can be effectively operated by use of the same format as when the digital compressed video signal. However, for recording digital data, it is important to consider the reliability of data.

Figure 15:
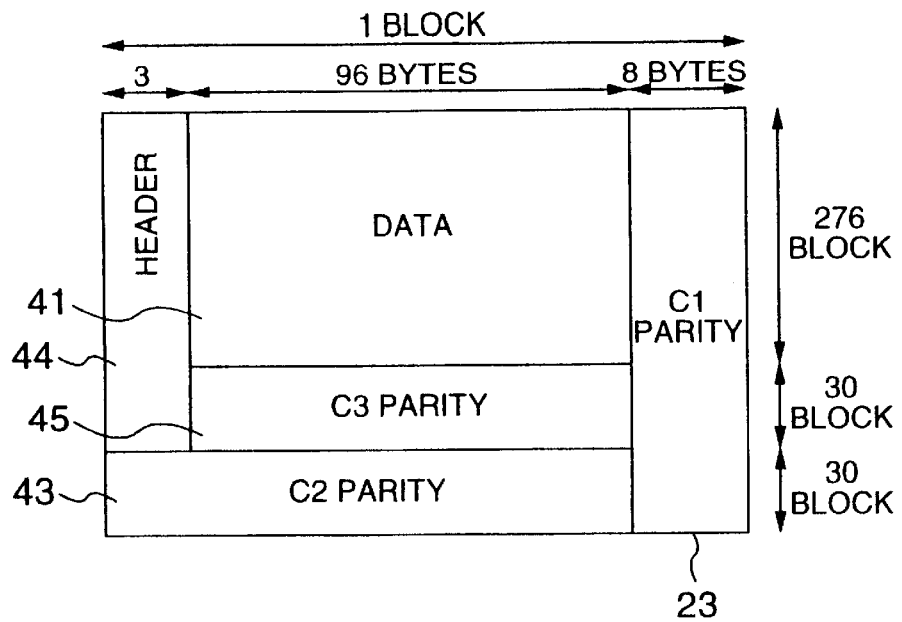
FIG. 15 is a diagram of the format of one-track data in the data recording area 7 in which digital data is recorded.

FIG. 15 shows the format of one track data in the data recording area 7 for digital data. In FIG. 15, the addition of C3 parity 45 improves the data reliability. As to the parity structure, for example, the C1 parity 23 has the same format as in FIG. 6, and the C2 parity 43 is constructed such that C2 parity of 10 blocks is added to each 102 blocks of ⅓ the 306 blocks of each track. The C3 parity 45 is formed such that C3 parity of 10 blocks is added to each 92 blocks which corresponds to a fraction of ⅟₁₈ the data of 276 blocks×6 tracks of each six tracks. Thus, by using the same numbers of parities C1 and C2 as in FIG. 6, changing only the way of scattering C2 data and employing the same number of C3 parities as that of C2 parities, it is possible to use the error correction circuit common to both a digital compressed video signal and digital data. Moreover, by arranging the C3 parity 45 over each unit of 6 tracks the same as the C2 parity in FIG. 6, it is possible to use the same memory capacity for scattering data, and the same way for memory control.

Of course, when the reliability is not so important, it is possible to use the same format as that shown in FIG. 6 for recording the digital compressed video signal.

When digital data is recorded, recording and reproduction are made for each unit of 6 tracks. Also, the digital data does not need time stamp 25. Therefore, for example, data of 192 bytes of two blocks is recorded as one packet 71. In this case, a maximum of 828 packets (158,976 bytes) can be recorded in six tracks. If the packet data is recorded in the order of the head and the following of each six tracks, and if information of whether effective data is recorded or not is included in the block information 33, even a small amount of data to be recorded can be treated. Of course, it is not necessary to begin recording from the head.

In the recording of digital data, if part of the format information 31, for example, a value different from that in the recording of the digital compressed video signal is selected as a recording mode, it can be detected at the playback time.

Figure 16:
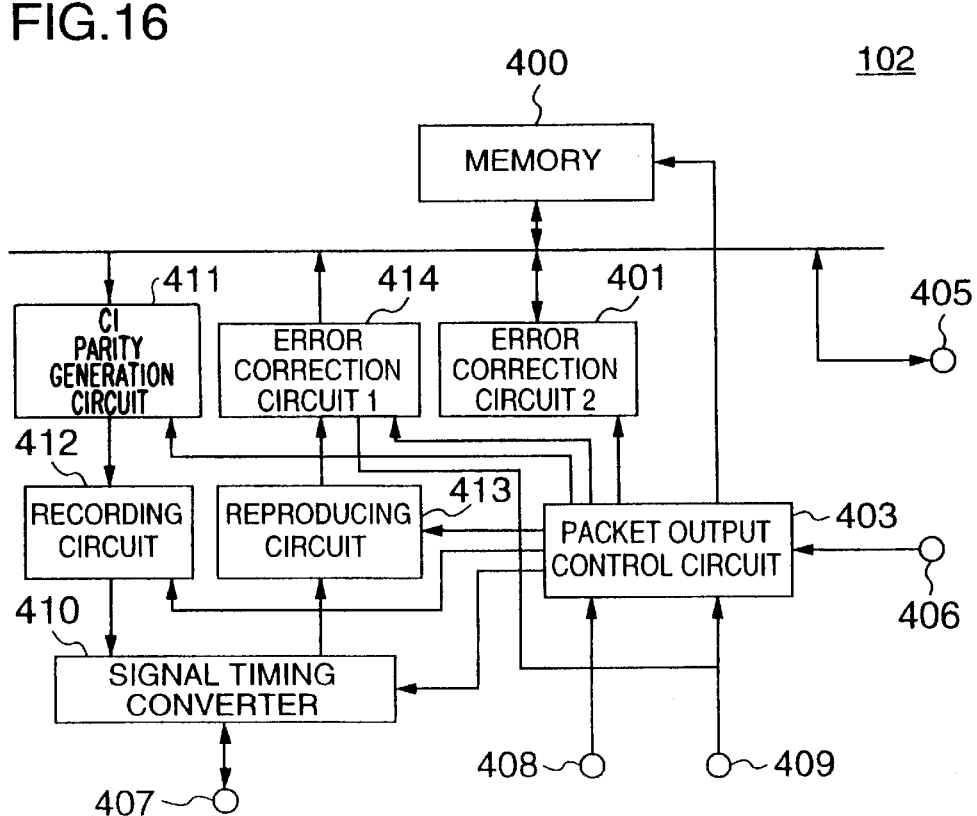
FIG. 16 is a block diagram of the signal processing circuit 102 in FIG. 1.

FIG. 16 shows the construction of the signal processing circuit 102. There are shown a memory 400 in which data is stored, an error correction circuit 401 for adding C2 parity and C3 parity and performing error correction at the time of playback, a C1 parity generation circuit 411 for generating and adding the C1 parity, a recording circuit 412 for generating a recording signal, a reproducing circuit 413 for detecting the reproduced signal, an error correction circuit 414 for performing C1 error correction at the time of playback, a signal timing converter 410 for the conversion of the timing for the recording and reproduced signals, and a packet output control circuit 403 for controlling the operation timing.

Figure 17:
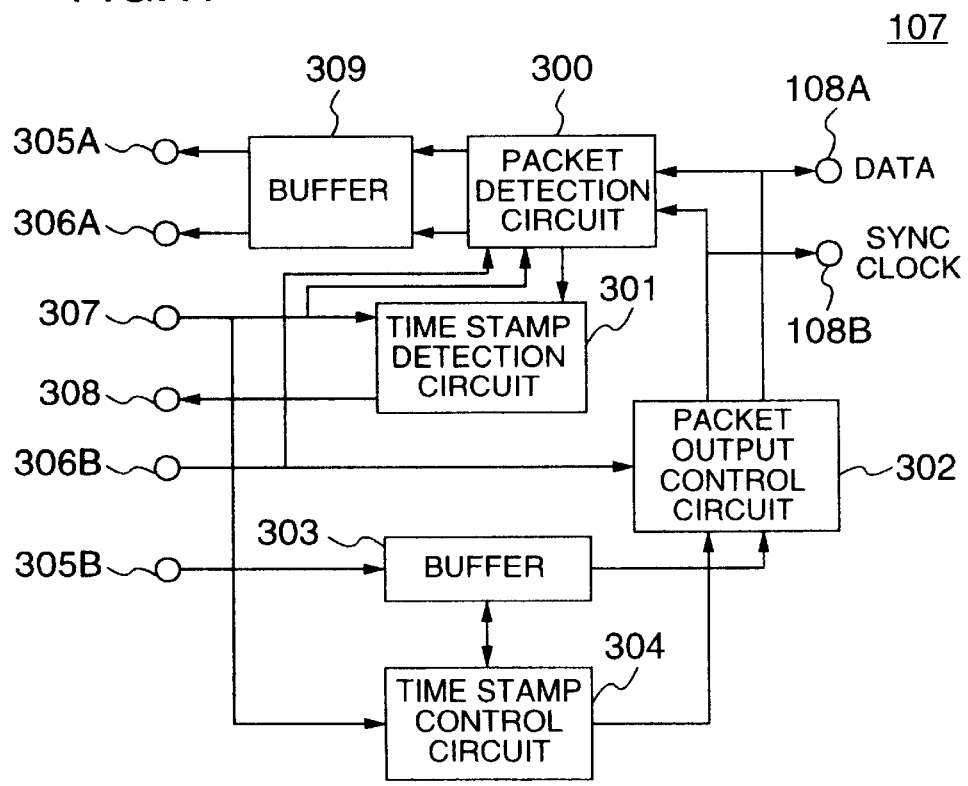
FIG. 17 is a block diagram of the interface circuit 107 in FIG. 1.

FIG. 17 shows the construction of the interface circuit 107. There are shown a packet detection circuit 300, a time stamp detection circuit 301, a packet output control circuit 302, buffers 303, 309, and a time stamp control circuit 304.

The operation of the apparatus at the time of recording and reproduction will be described with reference to FIGS. 16 and 17.

The case where a digital compressed video signal is recorded and reproduced will be described first. To record and reproduce a digital compressed video signal, there are used only the adjacent +azimuth head (D+) and −azimuth head (D−), mounted on one side, of the rotating heads 100.

At the time of recording, the operation timing of the recording and reproducing apparatus is controlled by the timing control circuit 109 on the basis of the rate of the recording data fed through the input/output terminal 108. At the playback time, the apparatus operates on the basis of the clock generated from the oscillator 110. The transmission rate of the packet entering and outgoing via the input/output terminal 108A is assumed to be higher than the frequency of the clock generated as the time stamp. For example, the frequency of the reference clock of the time stamp is 27 MHz, and it enters and outgoes at a rate of 49.152 bps. In addition, the frequency is the same as that of the reference clock generated from the oscillator 110 of the recording and reproducing apparatus. As will be described later, the process for recording and playback can thus be easily performed.

Figure 18:
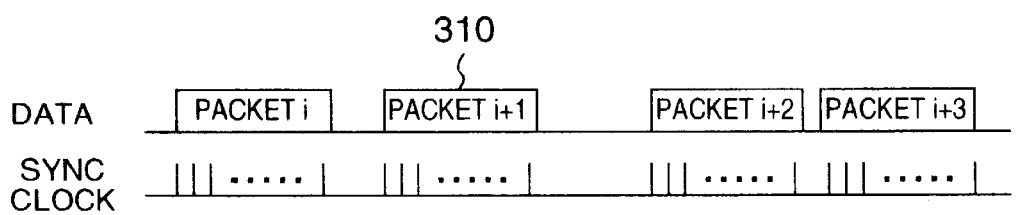
FIG. 18 is a timing diagram of an input/output signal.

At the recording time, data and synchronizing clocks are supplied via the input/output terminals 108A and 108B as shown by the timing of FIG. 18. Reference numeral 310 represents the data shown in FIG. 13. If it has no time stamp 25 added, the internally generated reference clock is added to each packet as the time stamp 25.

The incoming data and synchronizing clocks are supplied to the packet detection circuit 300, which detects the head of the packet in response to the clock fed from the timing signal generating circuit 105 via the input terminal 307. The head of the packet can be detected by detecting the blank between the packets and deciding the head when data has come after the blank. Moreover, this packet detection circuit 300 is able to discriminate the kinds of packets and decide whether the packets are normally transmitted or not by detecting the number of data per each packet. In other words, if the detected packet of which the length is other than the specified packet length (which the apparatus can handle), it decides that the packet is not normally transmitted or that data not recordable has been transmitted, and supplies this information to the control circuit 104 by which the recording is stopped.

Figure 19:
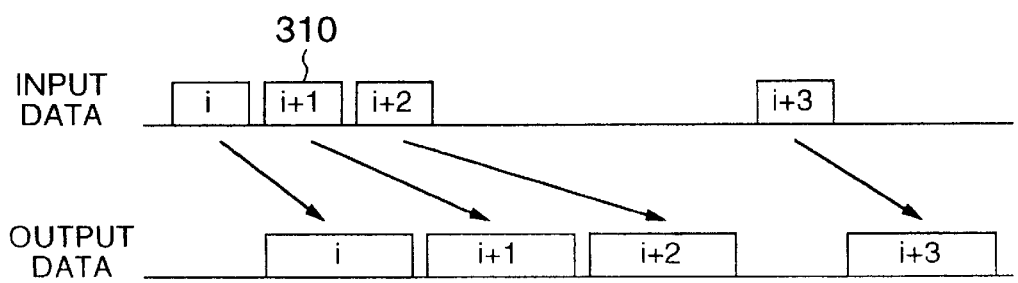
FIG. 19 is a timing diagram of input to and output from the buffer 309 in FIG. 17.

The packet 71 detected by the packet detection circuit 300 is supplied via the buffer 309 and through the output terminal 305A to the input/output terminal 405 of the signal processing circuit 102. The buffer 309 converts the transmission rate of input data into another value. In order to store data transmitted at a high rate of about 50 Mbps, a very fast memory is required as the memory 400. On the other hand, since the average maximum recording rate of the recording and reproducing apparatus is about 25 Mbps as described above, the memory 400 is adapted to handle data of a rate corresponding to the maximum recording rate, and data is fed through the fast buffer 309 to the memory 400, so that the storing speed of the memory can be reduced. FIG. 19 shows the input and output timing of the buffer 309. If the storing rate of the memory 400 is selected to be 27 Mbps (3.375 bytes/sec), the ratio between the input rate and output rate of the buffer is about 1:2. In this case, even if the capacity of the buffer is around 7 packets, data of 7 packets or more can be continuously fed at a rate of 50 Mbps.

The signal processing circuit 102 causes the memory 400 to store packet data from the input/output terminal 405 so that a packet fed during the period corresponding to one track to be recorded can be recorded on one track. In addition, the block information 33 and so on are added at this time. The data stored in the memory 400 is fed to the error correction circuit 401 where the C2 parity is added, and then fed to the C1 parity generation circuit 411 where the C1 parity is added. Thereafter, it is fed to the recording circuit 412 where the synchronizing signal and so on are added. Thus, the recording signal illustrated in FIG. 2 is generated. This signal is fed to the signal timing converter 410.

Figure 20:
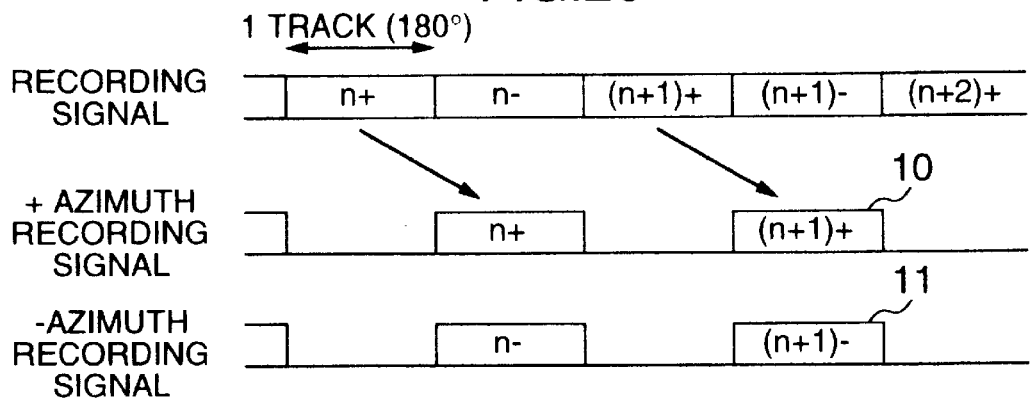
FIG. 20 is a timing diagram of the operation of the signal timing converter 410 at the time of recording in FIG. 16.

FIG. 20 shows the operation of the signal timing converter 410 at the time of recording. The signal timing converter 410 delays by one track the signal, to be recorded on the +azimuth track, of the recording signal that is fed in the order of +azimuth and −azimuth. The recording signals of +azimuth and −azimuth are simultaneously supplied via the input/output terminal 407 to the adjacent +azimuth head (+D) and −azimuth head (−D), located on one side, of the rotating heads 100, by which they are recorded on the magnetic tape 111. In other words, signals of two tracks are simultaneously recorded each time the rotating heads rotate once.

The control signals together with the packets are fed through the output terminal 306A to the control circuit 104, which then discriminates the kinds of packets and decides a recording mode. The time stamp 25 added to each packet is supplied to the time stamp detection circuit 301.

The time stamp detection circuit 301 compares the intervals between packets that are counted on the time stamp 25 and the clock fed through the input terminal 307. If there is a difference therebetween, the timing control circuit 109 responds to the control signal fed through the output terminal 308 to control the recording process timing and the revolution rate of the rotating heads 100 in order that the difference can be reduced to zero. If the recording process timing and the revolution rate of the rotating heads 100 are recorded in synchronism with the time stamp 25 at the time of recording, the reproduction and packet output can be controlled by the reference clock generated from the oscillator 110 of the recording and reproducing apparatus at the time of reproduction. That is, at the time of playback, the number of reproduced packets coincides with that of produced packets without a particular process for synchronization.

Figure 21:
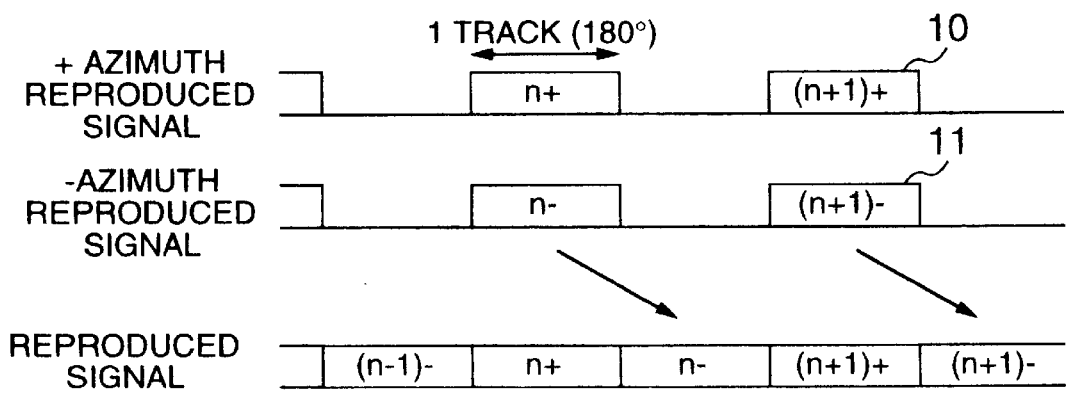
FIG. 21 is a timing diagram of the operation of the signal timing converter 410 at the time of reproduction in FIG. 16.

At the playback time, the reproduced signal from the +azimuth head (D+) and −azimuth head (D−) is fed through the input/output terminal 407 to the signal timing converter 410 of the signal processing circuit 102. As illustrated in FIG. 21, the signal timing converter 410 delays the reproduced signal from the −azimuth track by one track to produce a reproduced signal of which the +azimuth signal and −azimuth signal are alternately arranged in series. This reproduced signal is supplied to the reproducing circuit 413. The reproducing circuit 413 detects the synchronizing signal and detects the data of the reproduced signal. Then, the error correction circuit 414 corrects data for error by use of C1 parity, and the corrected data is stored in the memory 400. Thereafter, the error correction circuit 401 corrects the data for error by use of C2 parity. The corrected data is supplied through the input/output terminal 405 to the interface circuit 107.

The output fed through the input/output terminal 405 has no error as a result of identifying the reproduced block information 33 and flags added at the error detection time, and it includes only the effective packets, or does not include such packets as found not to be correctable. Therefore, abnormal data can be prevented from being produced.

In the interface circuit 107, the packet output control circuit 302 is controlled by the control signal that is fed from the control circuit 104 through the input terminal 306B, and the reproduced packet data is produced in synchronism with the reference clock generated from the oscillator 110. The packet fed to the input terminal 305B is stored in the buffer 303 at a rate of, for example, 27 Mbps (3.375 bytes/sec). The packets in the buffer 303 are read in synchronism with the time stamp 25 and the clock fed through the input terminal 307 at a rate of, for example, 49.152 bps, so that they can be produced timely as shown in FIG. 19, or according to the same timing as when the recording data was fed. Therefore, the signal after recording and reproduction can be processed in the same way as when the signal before recording is processed as it is, in the decoder for the digital compressed video signal and processors for processing the reproduced packets from other digital signal recording and reproducing apparatus.

The recording and reproduction of digital data will be described below. When digital data is recorded and reproduced, it is recorded and reproduced by the adjacent +azimuth head (D+) and −azimuth head (D−), arranged on one side, of the rotating heads 100, while the data that is being recorded is reproduced at the same time as when it is recorded, by the adjacent +azimuth head (D+) and −azimuth head (D−) arranged on the other side. In other words, the reliability in recording can be assured by reproducing the recorded data immediately after recording so that the recorded data can be confirmed, or that it can be decided if the data has been correctly recorded.

At the recording time, data and synchronizing signals are supplied through the input/output terminals 108A and 108B according to, for example, the timing shown in FIG. 18. When digital data is recorded, there is no need to manage the time stamp of data. Therefore, the packet data 310 may be the packet of only the data with no time stamp added, and particularly there is no need to manage the input intervals. Although not shown, the following cases are possible: if the data is found within the maximum recording capacity by transmitting a data request signal to the digital data output apparatus, data is sequentially received from the digital data output apparatus; and If the data is found to exceed the limit, the digital data output apparatus is kept waiting for producing. Of course, data may take other forms than the packet form.

The input data and synchronizing clocks are supplied to the packet detection circuit 300, at which the heads of packets are detected at the clock fed from the timing generating circuit 105 through the input terminal 307 in the same manner as the digital compressed video signal is treated.

The packet 71 detected by the packet detection circuit 300 is supplied through the buffer 309 and through the output 305A to the input/output terminal 405 of the signal processing circuit 102. Digital data is often fed in bursts. Therefore, for example, the capacity of the buffer 309 is selected to be 6 tracks or several times larger than that value, and data of six tracks collected in the buffer are supplied to the signal processing circuit 102 at a constant rate, so that digital data can be effectively recorded.

In the signal processing circuit 102, the packet data fed via the input/output terminal 405 is stored in the memory 400 so that the packet data supplied during a period corresponding to one track to be recorded can be recorded on one track. At this time, block information 33 and so on are added. The data stored in the memory 400 is fed to the error correction circuit 401 where C3 and C2 parities are added, and then fed to the C1 parity generation circuit 411 where C1 parity is added. In addition, the recording circuit 412 adds the synchronizing signal 20 and so on to the output from the C1 parity generation circuit 411, and generates the recording signal shown in FIG. 2. This signal is supplied to the signal timing converter 410, where it is converted in the same manner as in FIG. 20. The converted signal is then supplied through the output terminal 407 to both the +azimuth head (D+) and −azimuth head (D−), arranged on one side, of the rotating heads 100 by which it is recorded on the magnetic tape 111. In other words, signals of two tracks are recorded each time the rotating heads rotate once.

Figure 22:
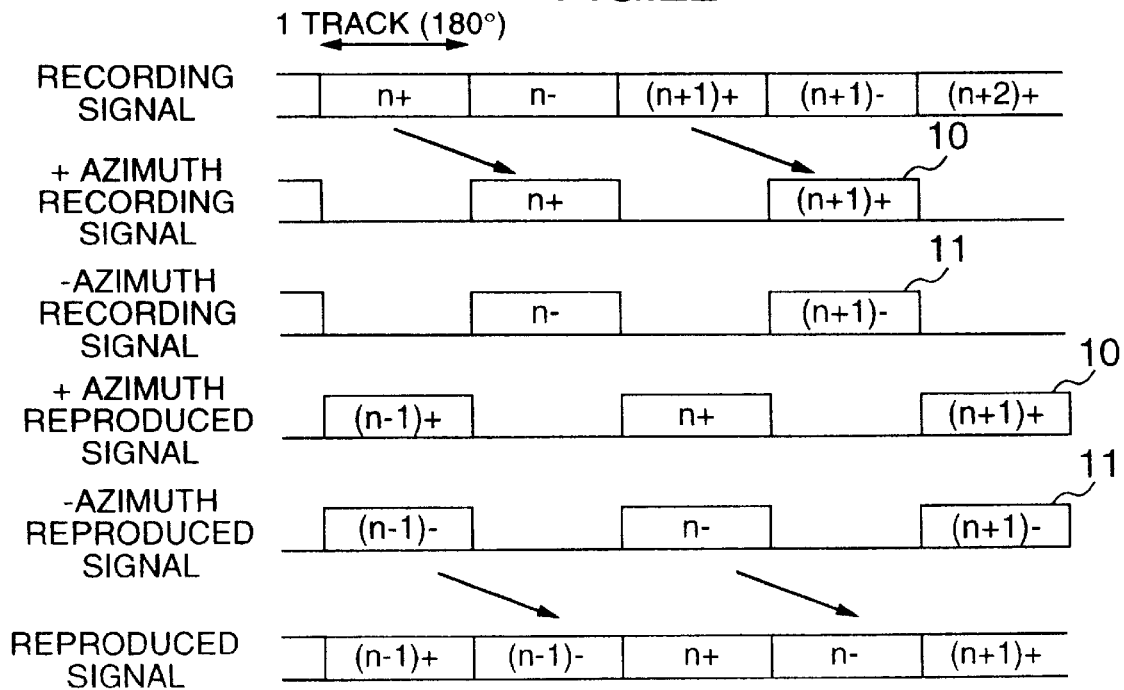
FIG. 22 is a timing diagram of the operation of the signal timing converter 410 at the time of recording digital data in FIG. 16.

When digital data is recorded, the data recorded by the +azimuth head (D+) and −azimuth head (D−) on the other side is also simultaneously reproduced as shown in FIG. 22. The reproduced data is converted by the signal timing converter 410 in the same manner as in FIG. 21, and fed to the reproducing circuit 413 where the synchronizing signal is detected. Then, the error correction circuit 414 performs error detection on that signal by use of C1 parity. The result of error detection is fed through the input/output terminal 409 to the control circuit 104 where it is decided if the recording is correctly performed. If the error exceeds an allowable value, the data is again recorded on a different location.

Thus, since the error correction circuit 414 detects error by use of C1 parity even at the recording time, the reliability in recording can be assured without providing circuits for exclusive use.

Digital data is reproduced similarly as is the digital compressed video signal. That is, digital data is reproduced by the same +azimuth head (D+) and −azimuth head (D−) as used at the recording time, and fed from the +azimuth head (D+) and −azimuth head (D−) through the input/output terminal 407 of the signal processing circuit 102 to the signal timing converter 410. In this converter, the reproduced signal from the −azimuth track is delayed one track so that +azimuth signal and −azimuth signal can be produced alternately in sequence as shown in FIG. 21. This reproduced signal is fed to the reproducing circuit 413. The reproducing circuit 413 detects the synchronizing signal and the data from the reproduced data. Then, the error correction circuit 414 performs error correction by use of C1 parity on the data and supplies the error corrected data to the memory 400 where it is stored. Thereafter, the error correction circuit 401 performs error correction on the data by use of C2 parity and C3 parity, and the corrected data is supplied through the input/output terminal 405 to the interface circuit 107.

The interface circuit receives the output from the input/output terminal 405 and identifies the reproduced block information 33 and the flag added at the time of error correction. When digital data is reproduced, all data is required to be reproduced without error. Therefore, if a packet is found not to be correctable, the packet is, for example, again reproduced.

In the interface circuit 107, the packet output control circuit 302 is controlled to be brought to the output mode in response to the control signal fed from the control circuit 104 through the input terminal 306B, and it produces the reproduced packet data. When digital data is reproduced, there is no need to manage the time stamp. Therefore, the data from the buffer 303 is produced at a rate of a certain constant unit. For example, the capacity of the buffer is selected to be 6 tracks or several times greater than that, and data of each six tracks is produced from the buffer.

Thus, since the signal timing converter is used, data of two channels can be recorded and reproduced, and simultaneous reproduction at the recording time can be performed, by the recording and reproducing circuits on one channel.

Figure 23:
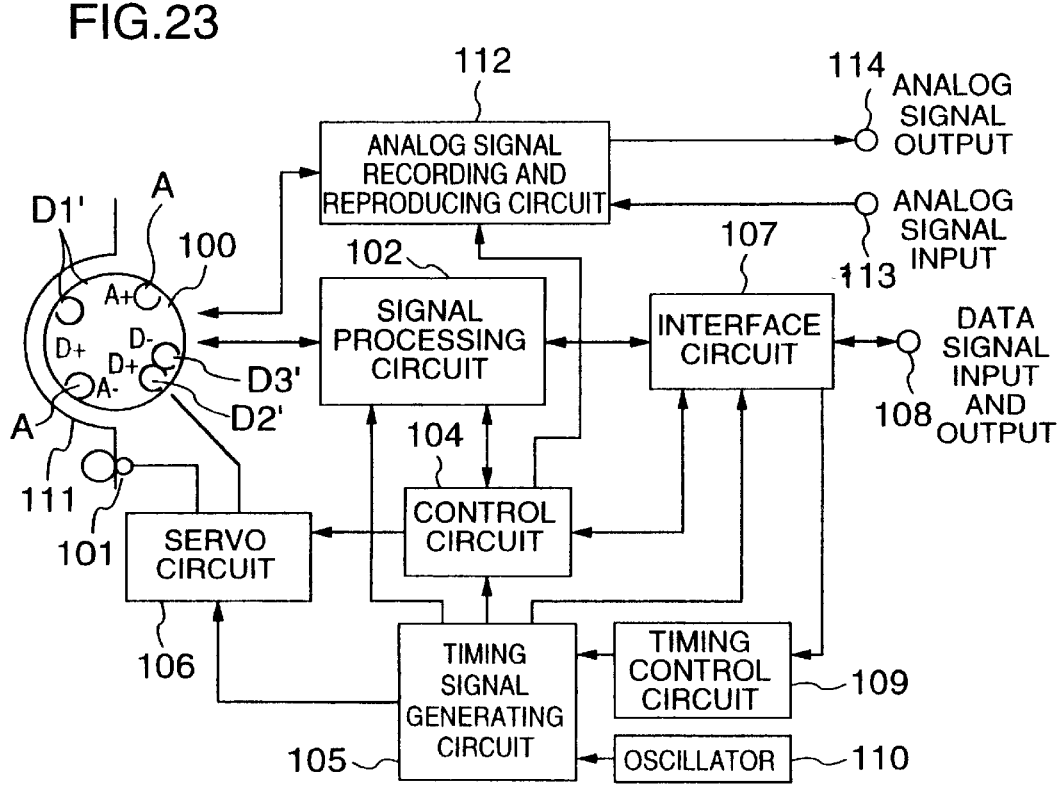
FIG. 23 is a block diagram of the second embodiment of a digital signal recording and reproducing apparatus according to the invention.

FIG. 23 shows the second embodiment of the digital signal recording and reproducing apparatus according to the invention. As illustrated in FIG. 23, a digital signal is recorded and reproduced by three azimuth heads, or +azimuth head D1' (D+) and −azimuth head D3' (D−) mounted opposite to each other, and the second +azimuth head D2' (D+) mounted close to the −azimuth head.

Figure 24:
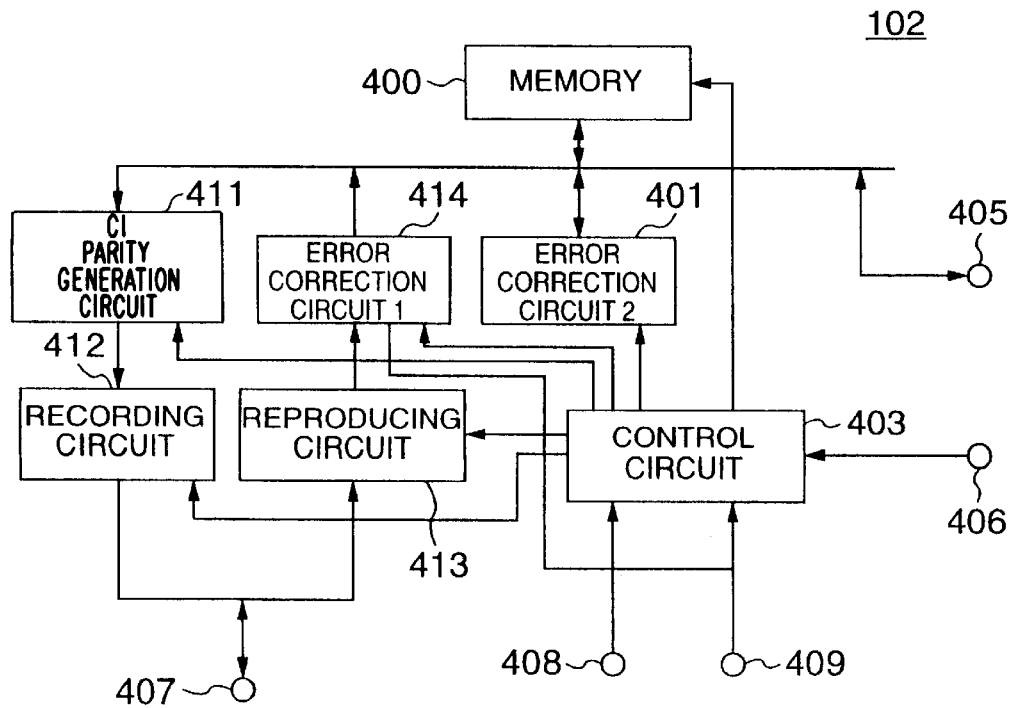
FIG. 24 is a block diagram of the signal processing circuit 102 of the digital signal recording and reproducing apparatus in FIG. 23.

FIG. 24 shows the construction of the signal processing circuit 102 of the digital signal recording and reproducing apparatus of FIG. 23.

Figure 25:
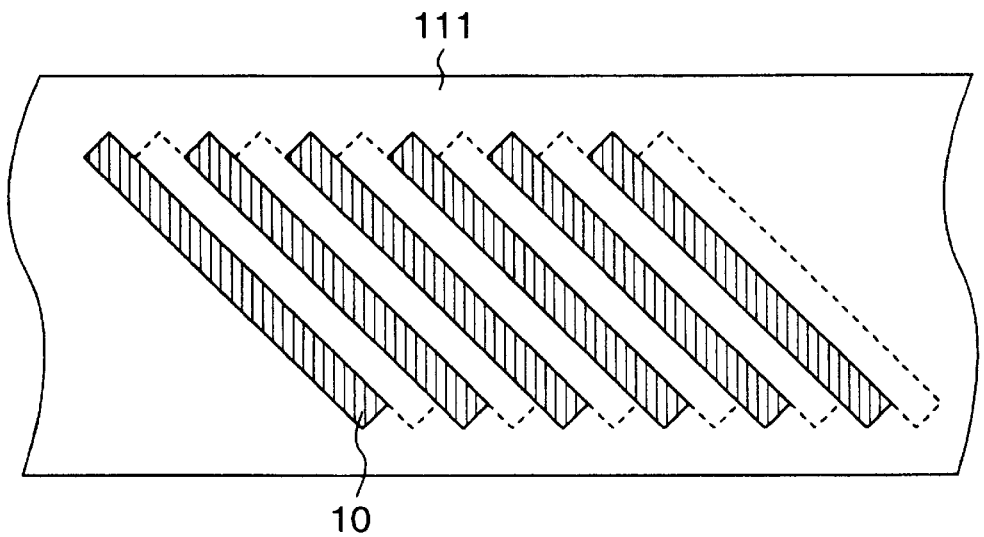
FIG. 25 is a diagram of a pattern recorded on a magnetic tape by the digital signal recording and reproducing apparatus of FIG. 23.
Figure 26:
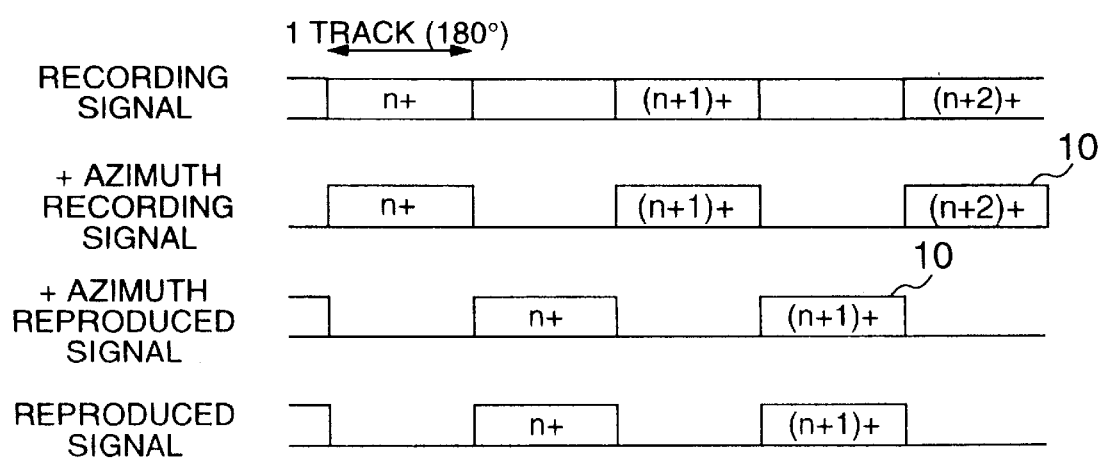
FIG. 26 is a timing diagram of recording and reproduction in the digital signal recording and reproducing apparatus of FIG. 23.

In this case, a digital compressed video signal and digital data can be recorded and reproduced without the signal timing converter 410 shown in FIG. 16. The digital compressed video signal can be recorded and reproduced by the opposite +azimuth head (D+) and −azimuth head (D−). The digital data can be recorded and reproduced only by one +azimuth head as shown in FIG. 25. At the recording time, the other +azimuth head is used to reproduce the recorded signal so that the recorded signal is confirmed, or that it is decided if the signal is correct as shown in FIG. 26. Thus, since recording and reproduction are made by a single head, the maximum amount of data to be recorded is reduced to ½ the normal amount, but the signal timing converter can be eliminated. In this case, the recording circuit 412 and reproducing circuit 413 are controlled to operate only during the period of ½ the full revolution of the rotating heads.

Figure 27:
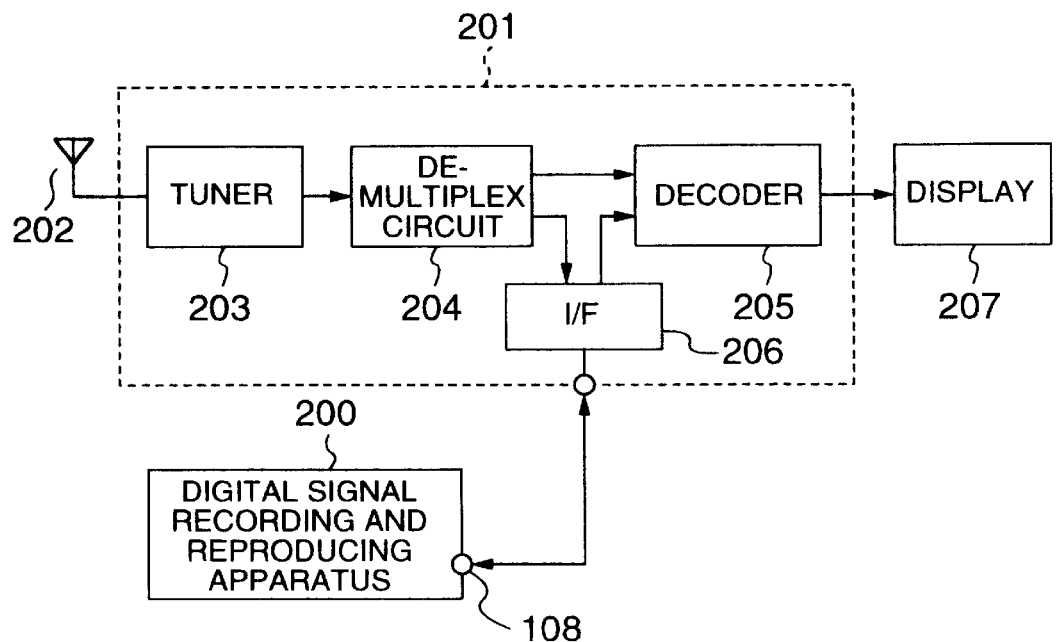
FIG. 27 is a block diagram of the digital signal recording and reproducing apparatus and a digital broadcast receiver which are connected to each other.

FIG. 27 shows an example of the connection between the digital signal recording and reproducing apparatus of FIG. 1 and a digital broadcast receiver. Reference numeral 200 represents the digital signal recording and reproducing apparatus of FIG. 1, 201 the digital broadcast receiver, 202 an antenna, and 207 a monitor, or display. In addition, reference numeral 203 designates a tuner, 204 a de-multiplex circuit, 205 a decoder, and 206 an interface circuit. A digital broadcast signal received by the antenna 202 is demodulated by the tuner 203, and then fed to the de-multiplex circuit 204 where a necessary digital compressed video signal is selected. The selected digital compressed video signal is decoded into a normal video signal by the decoder 205. The output from the decoder is fed to the monitor 207. When the received signal is a scrambled signal or other processed signal, the decoding circuit 205 descrambles and then decodes it.

The digital broadcast receiver 201 normally demodulates the received signal into the digital compressed signal, decodes the digital compressed signal into a normal video signal and audio signal by the decoder, and supplies them to the monitor of a television set. This digital compressed signal is transmitted in the normal packet form. The rate of transmission of packets is changed by the contents of a broadcast. The transmission interval of packets is also changed according to the process that was made at the encoding time. In the decoder, the frame frequency at the time of encoding is reproduced on the basis of the information included in the packet data and the interval between the transmitted packets, and the digital compressed signal is decoded into the video signal.

Before the received signal from the digital broadcast receiver 201 is recorded by the digital signal recording and reproducing apparatus, the interface circuit 206 adds a time stamp indicative of the transmission interval of packets to the digital compressed signal of the packet type and converts it into the form shown in FIG. 16. The converted signal is fed through the input/output terminal 108 to the digital signal recording and reproducing apparatus 200. When the time stamp is not added to the converted signal, the recording and reproducing apparatus 200 adds time information to the signal, and records it.

The digital compressed video signal reproduced by the digital signal recording and reproducing apparatus 200 is supplied from the input/output terminal 108 to the interface circuit 206 at the same intervals as at the recording time on the basis of the time stamp. The interface circuit 206 performs the same process as at the normal receiving time on the input signal, and supplies the processed signal to the decoding circuit 205. The decoding circuit decodes it into a video signal and audio signal and supplies those signals to the monitor 207.

Figure 28:
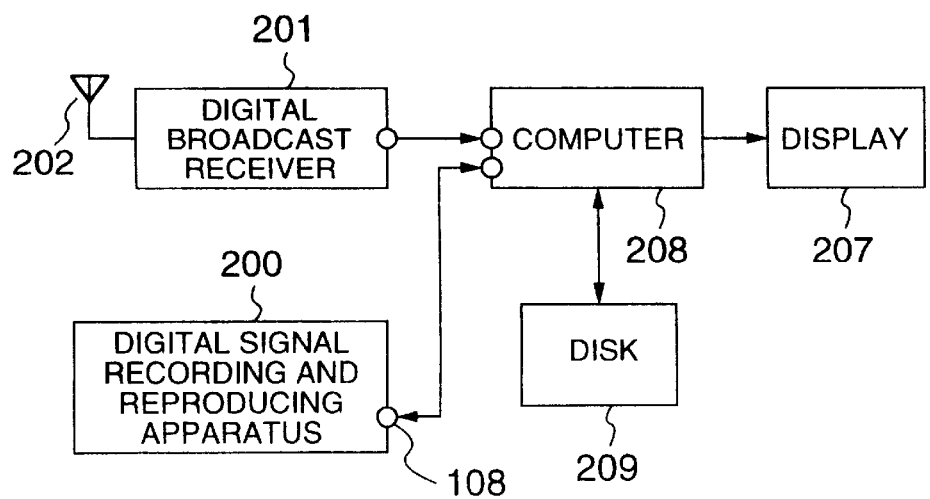
FIG. 28 is a block diagram of the digital signal recording and reproducing apparatus and a computer which are connected to each other.

FIG. 28 shows an example of the connection between the digital signal recording and reproducing apparatus of FIG. 1 and a computer. In FIG. 28, the computer 208 is also assumed to have the function to receive the signal from the digital broadcast receiver 201. In other words, the digital compressed signal received by the digital broadcast receiver 201 is decoded by the decoding circuit 205 incorporated in the computer 208. The decoded signal is fed to the monitor 207.

When a digital compressed video signal is recorded by the digital signal recording and reproducing apparatus 200, the digital compressed video signal from the digital broadcast receiver 201 is supplied through the computer 208 to the digital signal recording and reproducing apparatus 200. In addition, the reproduced digital compressed video signal from the apparatus 200 is decoded by the decoding circuit of the computer 208, and then fed to the monitor 207.

When the digital data recorded on a disk 209 or the like is recorded on the apparatus, the data recorded on the computer 208 is supplied to the apparatus 200. The digital data reproduced from the apparatus 200 is fed to the computer 208 and recorded on the disk 209 or the like.

The interface circuit in FIG. 17 can also be used for those of other apparatus such as the digital broadcast receiver 201.

Although the terminals for both input and output are used as input/output terminals in the above embodiments, input terminals and output terminals may be independently used.

According to the invention, since a signal timing converter is only added to the recording and reproducing circuits on one channel, the recorded data can be confirmed by simultaneous playback at the recording time without increasing the circuit scale of the apparatus for recording and reproducing the normal digital compressed video signal. Moreover, when digital data that needs high reliability is recorded and reproduced, only one azimuth head is used, and thus the number of heads can be reduced, and the signal timing converter is not necessary.

In addition, when a normal digital signal such as a digital compressed video signal is recorded and reproduced, two correction codes of C1 and C2 are used. When digital data that requires high reliability is recorded and reproduced, three correction codes of C1, C2 and C3 are used. Therefore, the recording capacity can be increased when the normal digital signal is recorded and reproduced, and reliability can be improved when digital data is recorded and reproduced. Since the correction code C2 is added to each six tracks even in the recording and reproduction of a normal digital signal, high reliability can be achieved against the dropout on the tape. Moreover, if the correction code C3 at the time of recording digital data is similarly added to each six tracks, and if the parity number is the same, the error correction circuit and memory can be used common to both cases.

What is claimed is:

1. A digital signal recording method for recording on each of tracks, or digital signal recording areas, of a magnetic recording medium a plurality of blocks each consisting of a digital signal, and added signals of a synchronizing signal, a control signal and an error correction code, said method comprising:

a first recording mode for adding a first error correction code to each n tracks (n is an integer larger than 1) of said digital signal, adding a second error correction code to each block of said digital signal and said first error correction code, and recording said digital signal with said first and second error correction codes added; and a second recording mode for adding a third error correction code to each n tracks of said digital signal, adding a fourth error correction code to each track of said digital signal and said third error correction code, adding a second error correction code to each block of said digital signal, said third error correction code and said fourth error correction code, and recording said digital signal with said second, third and fourth error correction codes added.

2. A digital signal recording method according to claim 1, wherein said first error correction code and said fourth error correction code have the same parity number.

3. A digital signal recording method according to claim 1, wherein said third error correction code and said fourth error correction code have the same parity number.

4. A digital signal recording method according to claim 1, wherein said n tracks is 6 tracks.

5. A digital signal recording method according to claim 1, wherein said control signal includes information for discriminating between said first recording mode and said second recording mode.

6. A digital signal recording apparatus for recording on each of tracks, or digital signal recording areas, of a magnetic recording medium a plurality of blocks each consisting of a digital signal, and added signals of a synchronizing signal, a control signal, and an error correction code, said apparatus comprising:

a first error correction code adder which, in a first recording mode, adds a first error correction code to each n tracks (n is an integer larger than 1) of said digital signal, and which, in a second recording mode, adds a third error correction code to each n tracks of said digital signal and adds a fourth error correction code to each track of said digital signal and said third error correction code; and a second error correction code adder which adds a second error correction code to each block of said digital signal and said first error correction code or said third error correction code and said fourth error correction code.

7. A digital signal recording apparatus according to claim 6, wherein said first error correction code and said fourth error correction code have the same parity number.

8. A digital signal recording apparatus according to claim 6, wherein said third error correction code and said fourth error correction code have the same parity number.

9. A digital signal recording and reproducing apparatus for recording on and reproducing from each of a plurality of tracks, or digital signal recording areas, of a magnetic recording medium a plurality of blocks each consisting of a digital signal having added thereto a synchronizing signal, a control signal, and an error correction code, the apparatus comprising:

a memory for storing a digital signal received for recording during a recording operation and reproduced during a reproducing operation;

an error correction code adding circuit for adding an error correction code to the digital signal stored in the memory;

a recording circuit for generating a recording signal including a plurality of blocks from the digital signal having the error correction code added thereto by the error correction code adding circuit;

a reproducing circuit for detecting the digital signal and the error correction code added thereto from a reproduced signal;

an error correction circuit for detecting and correcting errors in the digital signal detected by the reproducing circuit based on the error correction code detected by the reproducing circuit; and a first head and a second head provided on a single rotary head assembly for recording and reproducing and arranged at opposite positions with respect to one another;

wherein during the recording operation, the recording signal generated by the recording circuit is recorded on the magnetic recording medium by the first head of the single rotary head assembly, and the recording signal recorded on the magnetic recording medium by the first head is reproduced from the magnetic recording medium by the second head of the single rotary head assembly which is opposite the first head during a period during the recording operation when the first head is not recording the recording signal on the magnetic recording medium so that the reproducing circuit and the error correction circuit can detect any error in the recording signal reproduced from the magnetic recording medium by the second head; and wherein during the reproducing operation, the recording signal recorded on the magnetic recording medium by the first head is reproduced from the magnetic recording medium by the first head and is supplied to the memory after being subjected to error detection by the reproducing circuit and the error correction circuit.

10. A digital signal recording and reproducing apparatus according to claim 9, wherein a first recording and reproducing mode is provided for recording by the first head during the recording operation, and for reproducing by the second head during the recording operation at the same time as recording by the first head; and wherein a second recording and reproducing mode is provided in which reproducing is not performed by the second head.

11. A digital signal recording and reproducing apparatus according to claim 10, wherein a third recording and reproducing mode is provided for recording and reproducing an analog signal with a third head of the single rotary head assembly.

12. A digital signal recording and reproducing apparatus according to claim 9, wherein the first head includes two first head members having different azimuths mounted close to each other, and the second head includes two second head members having different azimuths mounted close to each other but opposing the two first head members.

13. A digital signal recording and reproducing apparatus according to claim 12, further comprising a signal timing converter which, during the recording operation, converts the recording signal generated by the recording circuit into a signal that is supplied to the two first head members during a period corresponding to ½ a full revolution of the single rotary head assembly, and during the reproducing operation, converts the reproduced signal from the two first or two second head members during the period corresponding to ½ the full revolution of the single rotary head assembly into a sequential signal that is supplied to the reproducing circuit.

14. A digital signal recording and reproducing apparatus according to claim 9, wherein the first head is a single first head, and the second head which opposes the first head has an azimuth which is the same as an azimuth of the first head.

15. A digital signal recording and reproducing apparatus according to claim 14, wherein the single rotary head assembly includes a third head mounted close to the second head and having a different azimuth from the azimuths of the first head and the second head.

16. A digital signal recording apparatus for recording on each of a plurality of tracks, or digital signal recording areas, of a magnetic recording medium a plurality of blocks each consisting of a digital signal having added thereto a synchronizing signal, a control signal, and an error correction code, the apparatus comprising:

a first error detection and correction adder which, in a first recording mode, adds an error detection and correction code to each n tracks (n is an integer larger than 1) of the digital signal, and which, in a second recording mode, adds the error detection and correction code to each n tracks of the digital signal and adds the error detection and correction code to each track of the digital signal; and a second error detection and correction adder which adds the error detection and correction code to each block of the digital signal and the error detection and correction code.

* * * * *